INVENTOR.
MILTON O. SCHUR
BY
ATTORNEY

United States Patent Office 3,102,458
Patented Sept. 3, 1963

3,102,458
TUBE WINDING APPARATUS AND PROCESS
Milton O. Schur, New Haven, Conn., assignor to Olin Mathieson Chemical Corporation, a corporation of Virginia
Filed Feb. 4, 1963, Ser. No. 256,039
2 Claims. (Cl. 93—80)

The present invention relates to packaging and relates in particular to convolute or spiral winding of sheet, web, or ribbon stock upon a mandrel to produce a tubular body, of composite or laminated structures, suitable for conversion into "can" bodies.

The term "can" bodies designates a segment or a length of the tubular body which when provided with end closures is suitable for containing or packaging fluid or solid material.

More particularly, the invention relates to a novel apparatus and a novel process for winding tubular bodies.

In the art of winding sheet, web or ribbon stock upon a mandrel, it is frequently necessary to move the stock relative to the mandrel.

For example, in the usual spiral winding operation, the stock is moved constantly relative to the mandrel as the winding progresses.

Correspondingly, convolute winding operations frequently involve motion of the stock relative to the mandrel during winding and certainly during removal of the tubular body from the mandrel after winding.

Presently, tubular bodies are usually fabricated from stock which is composed of a number of layers of material where each layer is selected to produce a desired characteristic or quality in the can or package ultimately fabricated. For example, the interior layers of the tubular bodies (those layers which are exposed to the material packaged) are metal foils, plastic films or like coatings to provide an impervious barrier.

The exterior layers are usually metal foils, plastic films or other thin sheets having surfaces which are especially suitable for receiving and retaining labelling, advertising or decorating indicia while the internal layers (which are sandwiched between the interior and exterior layers) usually comprise cellulosic sheets, such as kraft paper, to provide strength.

In prior art manufacturing procedures the interior or barrier layers are frequently not compatible with the mandrel upon which they are wound in that excessive friction develops between the barrier layer and the mandrel precluding free relative motion.

Experience shows that those interior or barrier layers which effect or demonstrate the desired impervious character in many instances also develop a high coefficient of friction with respect to the mandrel, an undesirable occurrence.

Thus, it is sometimes difficult, if not impossible, to move the interior or barrier layer relative to the mandrel during or after the tube-making operation. This is especially so when the mandrel becomes heated through friction during the tube-making process, or for any other reason, and where the interior surface of the tube being fabricated is thermoplastic.

One obvious way to overcome the friction difficulty would be to slack the winding tension but it is equally obvious that such a step would tend to lead to a loose, irregular, non-circular, unlaminated package, and to imperfect bonding between layers.

The present invention overcomes the friction difficulties described above and renders the interior barrier layer freely movable relative to the mandrel at all times; the free mobility is independent of the material from which the mandrel is fabricated and is independent of the material from which the barrier layer is fabricated.

It is a particular feature of the invention to provide a skin or cushion of air between the mandrel and the barrier layer of a multi-layer, convolutely or spirally wound tubular body.

It is a further feature of the invention to provide a process for winding tube bodies, convolutely or spirally, upon a mandrel while maintaining an exceedingly low coefficient of friction between the mandrel and the tubular body.

One simple apparatus for effecting the air cushion between the mandrel and the tubular body useful in practicing the process of the present invention contemplates utilizing a hollow mandrel having a plurality of radial openings disposed in circumferential array along the length of the mandrel, each opening having normally closed check valve means, so constructed and arranged that the valves are automatically opened upon the occurrence of winding stock upon the mandrel.

The check valves normally operate to retain the pressure until stock winding occurs upon the mandrel whereupon those check valves which are overlaid with stock material automatically open to permit the discharge of fluid under pressure to effect an array of air jets about the exterior of the mandrel and along that portion of the mandrel which is encircled by stock material.

As the mandrel is covered by stock during the formation of a tubular body, the air pressure discharging through check valves develops what I term a tubular skin or tubular cushion of air between the mandrel and the interior barrier layer of the tubular body.

This skin or cushion of air virtually eliminates the undesirable friction between the barrier layer and the mandrel while providing a sufficiently strong core or base upon which to perform a compact, well calendered spiral or convolute winding operation.

An apparatus embracing certain features of the present invention may comprise a hollow, tubular mandrel formed with a plurality of radially disposed through openings defining conduits leading from the interior of the mandrel to its exterior surface, check valve means disposed in each conduit normally disposed in a closed position, a suitable source of fluid under pressure including conduit means for introducing the fluid to the interior of the mandrel and thence to the check valves, and means for winding a sheet, web or ribbon of stock about the mandrel effective to create a multi-layer, tubular body, said stock cooperating with said mandrel to actuate the check valves successively to admit the fluid to the interior of the tube body to provide a skin or cushion of air between the mandrel and the interior layer of the tube body.

Though less convenient in operation, the perforated mandrel may be used without check valves in the air ports except at the zone where the barrier layer of tube stock is introduced on to the mandrel. In this case, the introduction of the barrier layer of tube stock on to the mandrel and of compressed air into the mandrel are delayed until all the free air ports on the mandrel are covered by the body stock. If the surface of the body stock tends to stick to the mandrel, or if the mandrel is to be used without check valves in any of the mandrel air ports, a low friction strip of paper (or other suitable sheet material) is used in place of barrier paper at the start of the tube making process. This strip is replaced with the barrier strip and the cushioning air supply turned on after the air ports in the mandrel have been covered by the low friction strip.

A process which embraces certain principles of the present invention may comprise the steps of winding stock upon a mandrel, moving the stock relative to the mandrel during the winding operation and providing a cushion of air between the mandrel and the stock to reduce the coefficient of friction between the exterior surface of the mandrel and the interior surface of the body.

Another process embracing certain other principles of the invention may comprise the steps of winding low friction stock upon a hollow mandrel having radial perforations, moving the stock relative to the mandrel during the winding operation until all perforations are covered, introducing air under pressure into the hollow mandrel so that it flows through the perforations to form a cushion of air between the mandrel and the stock and thereafter substituting a high friction stock for said low friction stock.

Other features and advantages of the present invention will become more apparent from an examination of the following specification when read in conjunction with the appended drawings in which.

Figure 1:
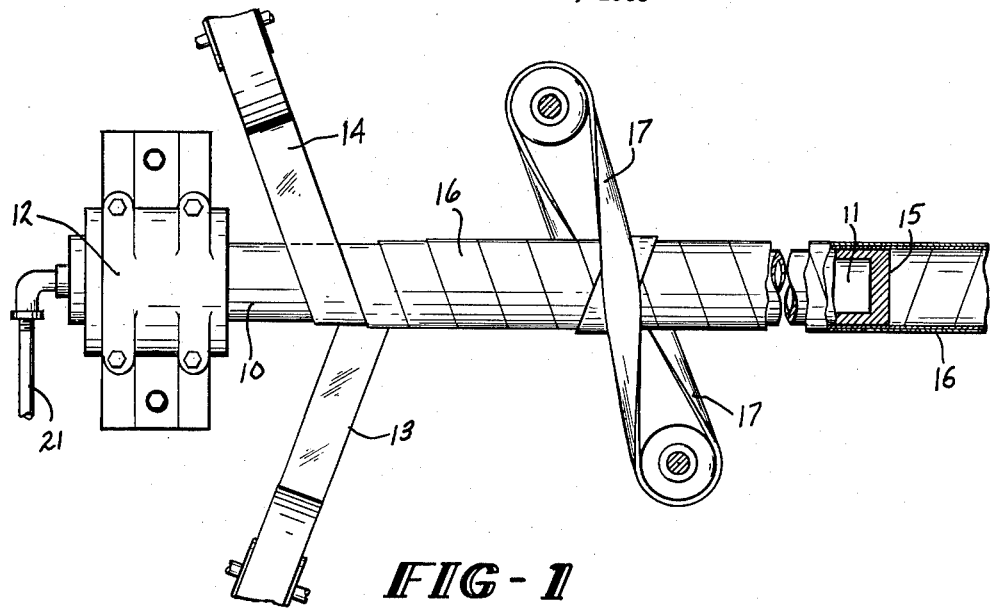
FIG. 1 is a plan view of a portion of a spiral tube winding device.
Figure 2:
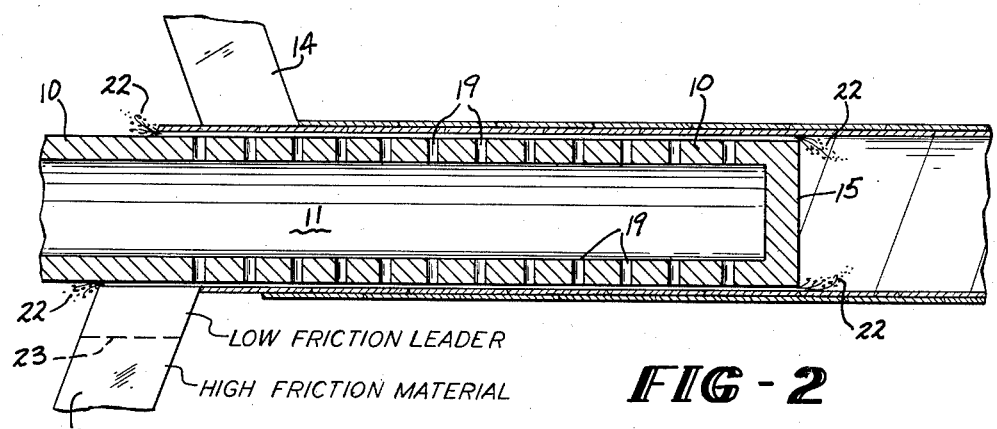
FIG. 2 is a longitudinal section of the tube winding mandrel of FIG. 1.

Referring now to the drawings, particularly FIGS. 1 and 2, there is shown a tube winding mandrel 10 having a hollow core 11 supported in bearing 12.

The mandrel is shown receiving two ribbons of stock material 13 and 14. The stock is wound into a tube 16 and is advanced (to the right as viewed in FIG. 1) over the stationary mandrel by tube encircling driven belt 17 in well known fashion.

As stated previously, the inner layer of stock, such as the layer represented by the ribbon 18 in FIG. 2, is frequently coated with a barrier or sealer material which often develops high friction relative to the mandrel. This high friction hinders motion of the tube relative to the mandrel both axially and rotationally.

To reduce this friction, the mandrel 10 is provided with a closed end 15 and a plurality of radial through holes 19—19 communicating with the hollow core 11; a steady pressure of air is applied to the mandrel through conduit 21 (FIG. 1) and the air flows through the holes 19—19 to provide a skin or cushion of air between the exterior of the mandrel and the interior of the tube. This air cushion, represented in FIG. 2 by the small bubbles labelled 22—22, provides freedom of motion of the tube and tube stock material relative to the mandrel with a minimum of friction.

In starting the tube winding operation using the mandrel of FIG. 2, it is sometimes advisable (to save air and to insure a good air cushion) to begin the run with a leader of low friction stock on the inner layer 18 with no air applied to the mandrel. After the leader has been wound into a tube of sufficient length to cover all radial holes 19—19, air is applied to the mandrel and the air cushion develops immediately. The length of the leader is selected so as to run out at the appropriate time and the high friction stock material, having been suitably spliced to the leader, is carried into the mandrel to form the inner tube layer. The air cushion operates to reduce the friction between inner layer and the mandrel. The end of a leader of low friction stock material is indicated by the dotted line 23 in FIG. 2.

Figure 3:
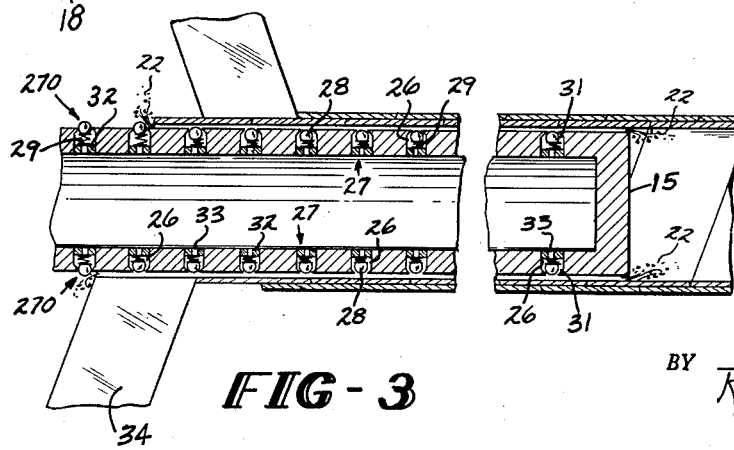
FIG. 3 is a longitudinal section of a modified tube winding mandrel.

FIG. 3 shows a modified mandrel structure. In this mandrel construction each radial opening 26—26 is provided with a normally closed check valve, indicated generally by the reference numeral 27, comprising a special ball 28 urged by a coil spring 29 to abut valve seat 31. The valve 27 is held in place by insert 32 having apertures 33—33.

The mandrel of FIG. 3 is advantageous because air pressure may be applied to the mandrel constantly since the valves 27 are normally closed. In addition, the valves are operated automatically by the inner layer of stock material 34 as it is wound upon the mandrel.

Note in FIG. 3 that check valves 270 are closed while check valves 27 are open.

Thus, in the FIG. 3 embodiment of the invention, the air cushion between the exterior of the mandrel and the interior of the tube is formed progressively and automatically as the ribbon of stock 34 as it encounters each valve during the winding operation.

It is to be noted further that the mandrel structure of the present invention lends itself readily to the application of a vacuum to the exterior surface of the mandrel should this step be desirable.

To develop a vacuum at the radial openings 19 of the mandrel of FIG. 2, for example, it is merely necessary to connect the conduit 21 of FIG. 1 to a vacuum source.

Furthermore, attention is directed to the fact that while the principles of the present invention have been explained and described in connection with a spiral tube winding device, the illustration of a spiral tube is merely exemplary; it is entirely within the spirit and scope of the present invention that the principles thereof be applied to a convolutely wound tube, i.e., a tube whose layers are wound without a lead or helix.

What is claimed is:

1. An apparatus for winding sheet, web or ribbon stock upon a mandrel to produce a tubular body, comprising a hollow mandrel formed with a plurality of circumferentially and longitudinally spaced openings providing conduits from the interior of the mandrel to the exterior thereof, normally closed check valves disposed in each conduit, said check valves being operable to an open position by the engagement therewith of stock material and means for winding stock upon the mandrel to form a tubular body, said stock material being operable to engage and actuate the check valves effective to permit the passage of fluid under pressure through the valve to develop an annular skin or cushion of air between the surface of the mandrel and the interior of the tubular body.

2. The process of forming sheet, web or ribbon stock into a tubular body upon a hollow mandrel having radial openings comprising the steps of first winding a ribbon of low friction stock upon the mandrel until all the mandrel openings are covered by stock, applying air under pressure to the hollow interior of the mandrel to develop an air cushion between the exterior of the mandrel and the interior of the stock and splicing a relatively high friction stock to said low friction stock while maintaining said air cushion whereby the high friction stock is freely movable relative to said mandrel.

References Cited in the file of this patent
UNITED STATES PATENTS 1,034,915    Kaiser _____ Aug. 6, 1912
3,042,103    McDevitt et al. _____ July 3, 1962